S. LEGER.
EGG BEATER OR THE LIKE.
APPLICATION FILED SEPT. 18, 1911.
1,032,551.
Patented July 16, 1912.
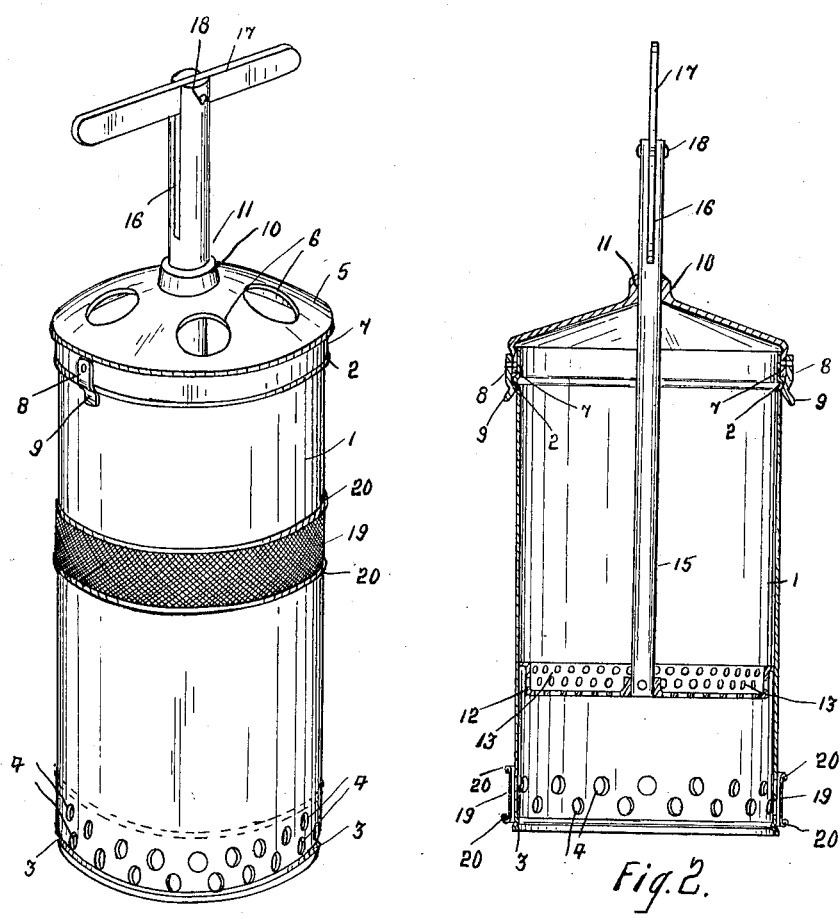
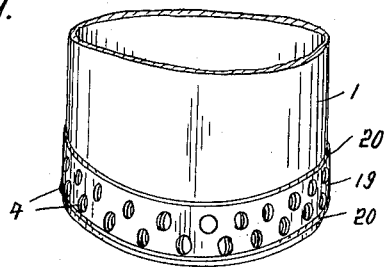
Witnesses.
Inventor.

UNITED STATES PATENT OFFICE.

SPLANDIEN LEGER, OF SUPERIOR JUNCTION, ONTARIO, CANADA.

EGG-BEATER OR THE LIKE.

1,032,551.

Specification of Letters Patent.

Patented July 16, 1912.

Application filed September 18, 1911. Serial No. 650,032.

*To all whom it may concern:*

Be it known that I, SPLANDIEN LEGER, of Superior Junction, Ontario, Canada, a subject of the King of Great Britain, have invented certain new and useful Improvements in Egg-Beaters or the Like, of which the following is a specification.

The invention relates to improvements in egg beaters or the like, as described in the present specification, and illustrated in the accompanying drawings, that form part of the same.

The invention consists essentially of a cylindrical casing, having adjustable openings in the side wall adjacent to the bottom thereof, and a plunger reciprocatorily arranged therein.

The objects of the invention are to devise an egg beater of simple construction, which may be readily cleaned, and will be efficient in operation for beating or whipping substances of varying consistencies, such as eggs or cream.

In the drawings, Figure 1 is a perspective view of the invention. Fig. 2 is a vertical sectional view of the invention. Fig. 3 is a detail view of the casing with the upper portion broken away, showing an alternative arrangement of adjusting the openings in the casing.

Like numerals of reference indicate corresponding parts in each figure.

Referring to the drawings, 1 is the casing cylindrical in shape, and open at the ends thereof.

2 is an outwardly projecting peripheral ridge extending around the casing adjacent to the top thereof.

3 is an inwardly extending peripheral groove extending around the casing adjacent to the bottom thereof, the ridges 2 and 3 materially strengthening the casing.

4 are orifices through the side wall of the casing adjacent the bottom thereof, and immediately above the groove 3, said orifices being arranged in any desired manner, and shown in the drawings as two circumferential rows, arranged alternatively.

5 is the cover of substantially conical shape, having the orifices 6 therethrough, and the downwardly extending flange 7 fitting around the top of the casing 1, and extending down to the ridge 2.

8 are spring clips secured on the flange 7, and extending down over the ridge 2, where they are offset inwardly to form the catch 9.

10 is a boss at the top of the conical cover 5, having the central orifice 11 therethrough.

12 is a plunger formed of finely perforated sheet metal, and having the up-turned flange 13 extending therearound, and snugly fitting the interior of the cylindrical casing 1.

15 is the plunger rod fixedly secured to the lower end thereof to the center of the plunger 12, and extending upwardly through the opening 11 in the cover 5. The upper end of the rod 15 is slotted at 16.

17 is a handle pivotally secured midway of its length in the slot 16 by the pin 18. The handle 17 when turned crosswise of the rod 15, as shown in Fig. 1, may be conveniently grasped by the hand to reciprocate the plunger in the casing, whereas when the handle is turned to vertical position, as shown in Fig. 2, the rod with the handle may be readily passed through the orifice 11 in the top 5.

In using the beater as in beating eggs, they are placed in any convenient receptacle, and the lower end of the beater set in the receptacle and the plunger reciprocated, as above described. This action will force the egg or other substance through the orifices 4 at the bottom of the casing and the perforations in the plunger, quickly beating the eggs to a froth, the plunger always forcing the substance on the interior of the casing to the bottom thereof, thereby leaving only the lower portion to be cleaned, which may be readily done under all ordinary conditions. If it is desired to thoroughly clean the several parts of the beater, the plunger may be readily removed by turning the handle as shown in Fig. 2, in passing the rod 15 with the plunger out of the lower end of the casing. The top 5 may also be readily removed by springing the clips 8 clear of the ridge 2.

19 is a band of wire mesh reinforced by the rings 20, and slidably arranged on the outside of the casing 1. The band 19 may not be found necessary for beating ordinary substances to a froth, but where any substance such as cream, is desired to be quickly whipped to a froth, the band 19 of wire mesh is slipped down to the lower end of the casing over the orifices 4, as shown in Fig. 2, and on working the plunger the substance is therefore forced through the fine mesh, and more quickly beaten or whipped to a froth.

In Fig. 3 the band 19 is shown with orifices corresponding in number and position to the orifices 4 in the casing, said band being readily turned about the casing to eclipse to any extent the orifices 4, thereby adjusting the size of said orifices to suit the substance being beaten or whipped.

What I claim as my invention is:

An egg beater, comprising a cylindrical shaped casing open at the bottom and having a plurality of orifices through the side wall thereof adjacent to the bottom, a cover fitting the top of said casing and having openings therethrough, a plunger fitting the interior of said casing, a rod secured at the lower end thereof to said plunger and extending upwardly through said cover and having a slotted outer end and a cross bar fitting the slotted upper end of said rod and pivotally secured therein intermediate of the length thereof.

Signed at the city of Ottawa, Canada this 18th day of August 1911.

SPLANDIEN LEGER.

Witnesses:
THOMAS R. BALMER,
R. L. MACGIBBON.

Copies of this patent may be obtained for five cents each, by addressing the "Commissioner of Patents, Washington, D. C."